United States Patent [19]
Lipp et al.

[11] Patent Number: 5,536,478
[45] Date of Patent: Jul. 16, 1996

[54] ELECTRICAL LEADS FOR A FLUID HEATERS

[75] Inventors: G. Daniel Lipp, Painted Post; Alfred N. Mack, Corning; Paul S. Schmitt, Big Flats, all of N.Y.

[73] Assignee: Corning Incorporated, Corning, N.Y.

[21] Appl. No.: 347,723

[22] Filed: Dec. 1, 1994

[51] Int. Cl.$^6$ .......................... F01N 3/10
[52] U.S. Cl. .............. 422/174; 422/199; 60/300; 219/541; 219/552; 174/102 P; 174/118
[58] Field of Search ............ 422/174, 199; 60/300; 219/501, 552, 541, 205; 174/102 P, 118

[56] References Cited

U.S. PATENT DOCUMENTS

| | | |
|---|---|---|
| 2,334,756 | 11/1943 | Eichinger ............ 174/102 P |
| 3,839,623 | 10/1974 | Portmann ............ 219/541 |
| 4,001,760 | 1/1977 | Howie et al. ............ 338/238 |
| 4,033,028 | 7/1977 | Howie et al. ............ 29/611 |
| 4,112,410 | 8/1978 | Wrob et al. ............ 338/243 |
| 4,313,247 | 2/1982 | Stuttard ............ 29/33 F |
| 4,739,155 | 4/1988 | Rodgers et al. ............ 219/537 |
| 4,934,831 | 6/1990 | Volbrecht ............ 374/183 |
| 4,998,341 | 3/1991 | Jones ............ 29/828 |
| 5,111,002 | 5/1992 | Hollander ............ 174/102 P |
| 5,146,743 | 9/1992 | Maus et al. ............ 422/174 |
| 5,161,894 | 11/1992 | Bourigault ............ 374/185 |
| 5,238,650 | 8/1993 | Sheller et al. ............ 422/174 |
| 5,240,682 | 8/1993 | Cornelison et al. ............ 422/174 |
| 5,271,906 | 12/1993 | Yuuki et al. ............ 60/297 |
| 5,317,869 | 6/1994 | Takeuchi ............ 422/174 |

*Primary Examiner*—Robert J. Warden
*Assistant Examiner*—Hien Tran
*Attorney, Agent, or Firm*—Kees van der Sterre

[57] ABSTRACT

A lead construction for a fluid heater such as an electrically heated catalytic converter, is set forth including a mineral insulated cable having a central core connected to the heater element of the fluid heater, an outer metal sheath connected to an enclosing housing for the fluid heater, and electrical insulation between the central core and the outer sheath.

12 Claims, 2 Drawing Sheets

ELECTRICAL LEADS FOR A FLUID HEATERS

BACKGROUND OF THE INVENTION

The invention relates to an electrical lead configuration especially adapted for use with an electrically heatable fluid heater, such as an electrically heatable catalytic converter, to carry electric current through a surrounding metallic housing to an electrically heatable catalytic converter core, without shorting to the housing.

Catalytic converters are utilized in the exhaust system of internal combustion engines to convert pollutant materials, such as carbon monoxide, unburned hydrocarbons and nitrogen oxides to non-pollutant materials such as carbon dioxide, nitrogen and water. However, in order to be effective at a high conversion rate, the catalyst surface of the converter must be at an elevated temperature in order to convert the exhaust gases to harmless by-products. Hence, it can be useful to initially heat the catalyst prior to engine start-up and during cold starts. To achieve initial heating of the catalyst, one current approach is to provide an electrically heatable catalytic converter, formed usually of a metallic honeycomb heater body which is sealed into the exhaust system, and which is provided with electrical power from the automobile's battery or alternator.

The resistance of the metallic honeycomb heater body is used to heat the converter, and accordingly electric power must be supplied to the heater body at opposite portions thereof. To accomplish this, at least one electrical lead must extend through the housing and be electrically isolated from the housing. Where only one electrode is used, the housing, being attached to the chassis of the automobile, becomes the opposite pole of a voltage source. Where two electrical leads of opposite charge are used, both must extend, in an electrically isolated manner, through the housing and be attached to the metallic heater body.

The most thermally demanding conditions upon electrical leads, such as insulated terminals or electrodes of the prior art, are during the engine operation, when the gas passing through the electrically heated catalytic converter may be at a temperature of between 800° and 1000° C. Some of this heat is transmitted to the electric feed through, such as shown in U.S. Pat. Nos. 5,053,603 to Wagner et al. and 5,238,650 to Sheller et al., resulting in the terminal or connecting electrode being too hot for the convention wire materials and insulation utilized in flexible insulated copper wire to be connected thereto. That is, the conventional insulation utilized in flexible insulated copper wire is usually polyvinyl chloride (PVC) or tetrafluoroethylene resins which have a tendency to melt or dry out and crack under such thermal conditions, resulting in a break down of the insulation. The copper wire then has a tendency to become corroded, due to salt and moisture in the external environment, thus resulting in the failure of an electrical connection to the electrically heated catalytic converter. Further, many terminals of the prior art also suffered problems from gas leakage and corrosion.

It thus has been an object of the invention to provide an improved electrical connection to the metallic heater body of a fluid heater such as an electrically heated catalytic converter, without the detrimental effects and disadvantages encountered with the connecting terminals and electrodes of the prior art.

SUMMARY OF THE INVENTION

The present invention sets forth a method and a structure for connecting electrical power to the heating element of a fluid heater, such as a metallic honeycomb heater body of an electrically heated catalytic converter. The electrical connection to the electrically heated catalytic converter is made by the use of a mineral insulated cable. A mineral insulated cable has a conductive core, made for example of copper, copper/nickel alloy, or other metals such as stainless steel; an oxide insulating layer, typically made of MgO or $Al_2O_3$ which provides electrical isolation of the conductor; and a metal sheath, made typically of stainless steel, which provides rigidity and protection from the external environment. The conductive core of the mineral insulated cable is welded to the metallic heater body, and the metal sheath is welded to an outer can or metal enclosure for the heater body, there being insulating material therebetween to electrically isolate the heater body from the metal enclosure.

The mineral insulated cable extends for several inches externally of the exhaust system, prior to being connected to conventional flexible insulated copper wire. The temperature of the conducting core and the exterior sheath of the mineral insulated cable is reduced over such distance to a level at which conventional wire and its insulation can be utilized without detrimental effects.

DESCRIPTION OF THE PREFERRED EMBODIMENTS

Figure 1:
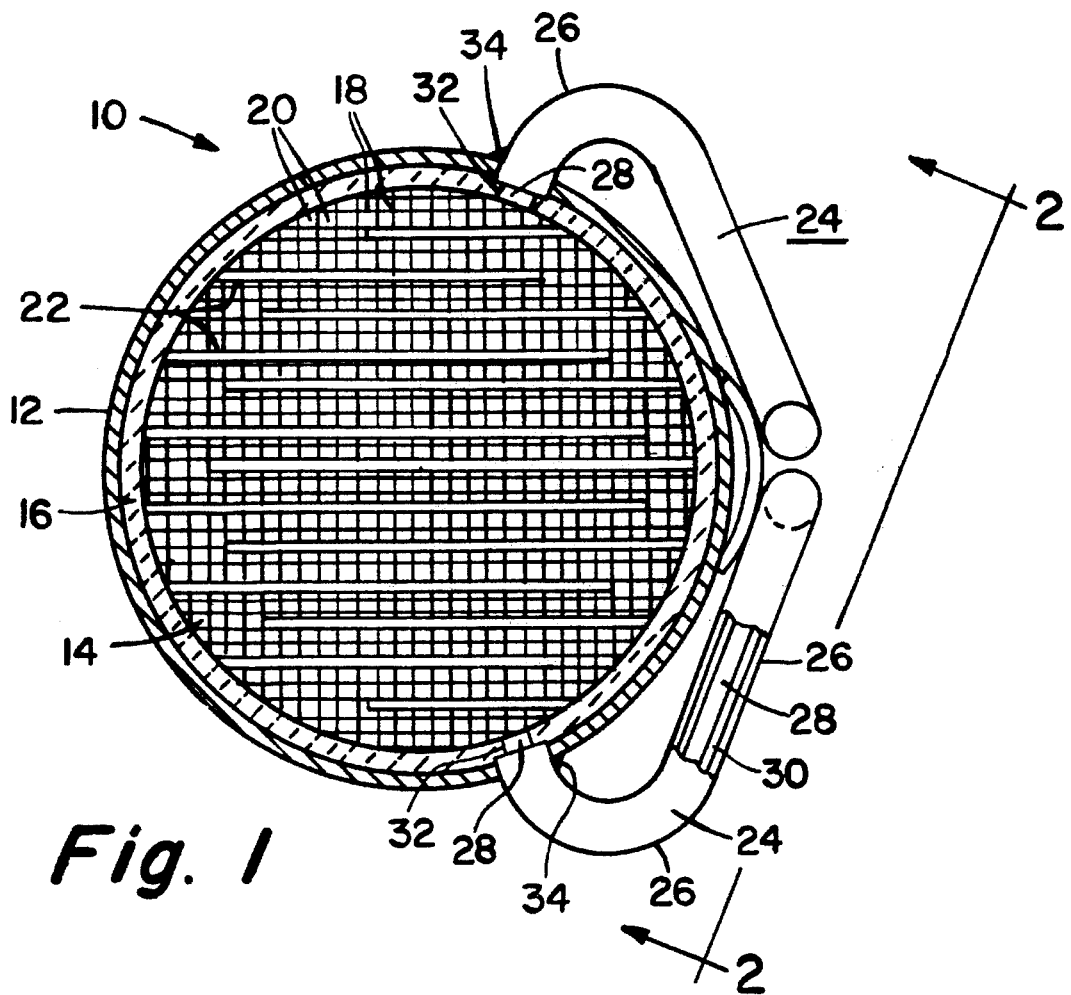
FIG. 1 is a somewhat schematic end elevational view, partially in section, of an electrically heated catalytic converter illustrating mineral insulated cable connections to the heater element.
Figure 2:
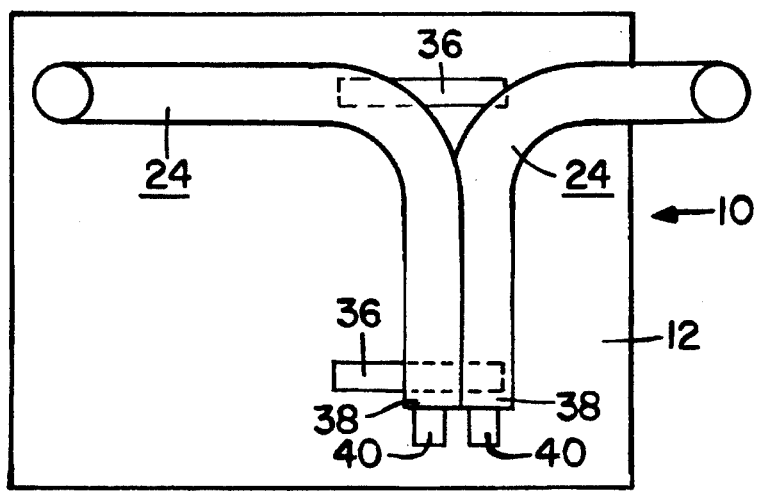
FIG. 2 is a side elevational view taken along line II—II of FIG. 1.

Referring now to FIGS. 1 and 2, an electrically heated catalytic converter 10 is shown having an outer metal can or enclosing housing 12, an electrically conductive heater body element 14, and a suitable ceramic insulation 16 which both electrically isolates the heater body element 14 from the enclosing housing 12, and supports the heater body element 14 within the housing against detrimental vibration. The electrically conductive heater body element 14 is shown in the form of a metallic honeycomb structure having a plurality of interconnected webs 18 forming a plurality of cells 20 therebetween which extend through the honeycomb heater body element. A plurality of slits 22 are shown formed in the metallic honeycomb body 14 which function as a resistance adjusting mechanism for the resistance heater element 14.

Two mineral insulated metal-sheathed cables 24 are shown being connected to the electrically heated catalytic converter 10. Each mineral insulated metal-sheath cable 24 has an outer sheath 26 which can be made from any malleable metal, an inner conductive core 28 which may be in the form of multiple wires or a single wire (solid core) of copper, copper/nickel alloy or nickel, and insulation material 30 therebetween which separates the conductive core 28 from the outer sheath 26.

The outer sheath 26 may be easily formed or bent so that it can accommodate virtually any desired configuration. In addition, the sheath serves to isolate and protect the conductive core 28 and the insulation 30 from hostile environment contamination and mechanical damage. The sheath material may be formed of various stainless steels including 304 SS, 310 SS, 316 SS, 347 SS, 409 SS, and 446 SS as well as nickel 201, platinum rhodium alloy, molybdenum, titanium and other high melting point alloys. The mineral insulation material 30 provides excellent high temperature dielectric strength, and may include such materials as high purity magnesium oxide (MgO), alumina oxide ($Al_2O_3$), silica oxide ($SiO_2$) and beryllium oxide (BeO) or other oxide materials.

In the preferred embodiment of the invention as shown in FIGS. 1 and 2, for each lead of cable 24 to the electrically heated catalytic converter 10, the inner conductive core 28 of the mineral insulated cable 24 extends into the enclosing housing 12 and through the ceramic insulation 16 of the exhaust system and is stud welded at 32 directly to the heater element 14. In this embodiment, core 28 is a solid core rather than a stranded lead, to facilitate welding to heater element 14.

The outer sheath 26 of the mineral insulated cable 24 is preferably welded to a washer which in turn is welded to the metal can or housing 12 of the exhaust system enclosure, or the sheath may be directly welded to the enclosing housing 12 as shown at 34 in FIG. 1.

The mineral insulated metal cable 24 external of the exhaust system 10 is then bent to a configuration which depends upon the available space in the particular automobile in which it is installed. A stand off 36 is utilized to maintain the mineral insulated metal-sheathed cables 24 in spaced relation from the exhaust system enclosure 10 to facilitate cooling. The cold ends 38 of the mineral insulated cables 24, remote from the welded connection, are positioned in close proximity to each other and can be directly sealed into one half of a two-pole connector 40. The other half of the connector may be connected to the end of flexible insulated copper wire from the automobiles electrical system. Alternatively, the cold ends 38 of the mineral insulated cable 24 could terminate in a convention flexible wire which extends to a remote connector or terminal block.

A preferred mineral insulated cable for use with electrically heated catalytic converters includes a sheath made of 409 stainless steel, a solid central inner conductive core formed of nickel 200 or 201, and a magnesium oxide (MgO) insulation material between the sheath and the conductive core. Such mineral insulated metal-sheathed cable is available from the Watlow Gordon Company of Richmond, Illinois under their registered trademark XACTPAK® mineral insulated, metal-sheathed cable.

Whereas the prior art connectors to electrically heated catalytic converters required the use of a complex assembly of stud terminals or electrodes requiring external insulation and a force fit or shrunken metal sleeve thereabout, the mineral insulated cable of the present invention is merely welded directly to the heated element and the enclosing housing for the converter, thus materially simplifying manufacture. However, more importantly, the studs or electrodes of the prior art transmitted substantial heat to the conventional flexible insulated copper wire utilized in automobiles. This caused the insulation in such copper wire to melt and break down, permitting the oxidation and deterioration of the wire and producing an inoperative condition.

The usual polyvinyl chloride (PVC) insulation utilized in conventional flexible insulated copper wire can withstand a maximum temperature of about 130° C., whereas the temperatures exhibited by an operating exhaust system range from about 800° C. to 1000° C., thus causing the breakdown of the PVC insulation. A two to three inch length of mineral insulated cable of the present invention will bring the temperature of about 600°–800° C. adjacent the connected end welded to the heater element down to a temperature below 200° C., and a length of such cable up to 5 inches for example, between 4 inches and 5 inches will bring the temperature at the end remote from the connection down to below 130° C., thus permitting the connection of conventional flexible insulated copper wire utilized in automotive systems.

Accordingly, not only is the thermal problem of prior art connectors solved, but also in view of the fact that the mineral insulated metal-sheathed cable is of unitary construction and the outer sheath is welded to the enclosing housing of the catalytic converter and the inner core is directly welded to the heater element, the resulting electrical lead is sealed from the ravishes of the external environment, including salt and water which have a tendency to corrode such connections.

Figure 3:
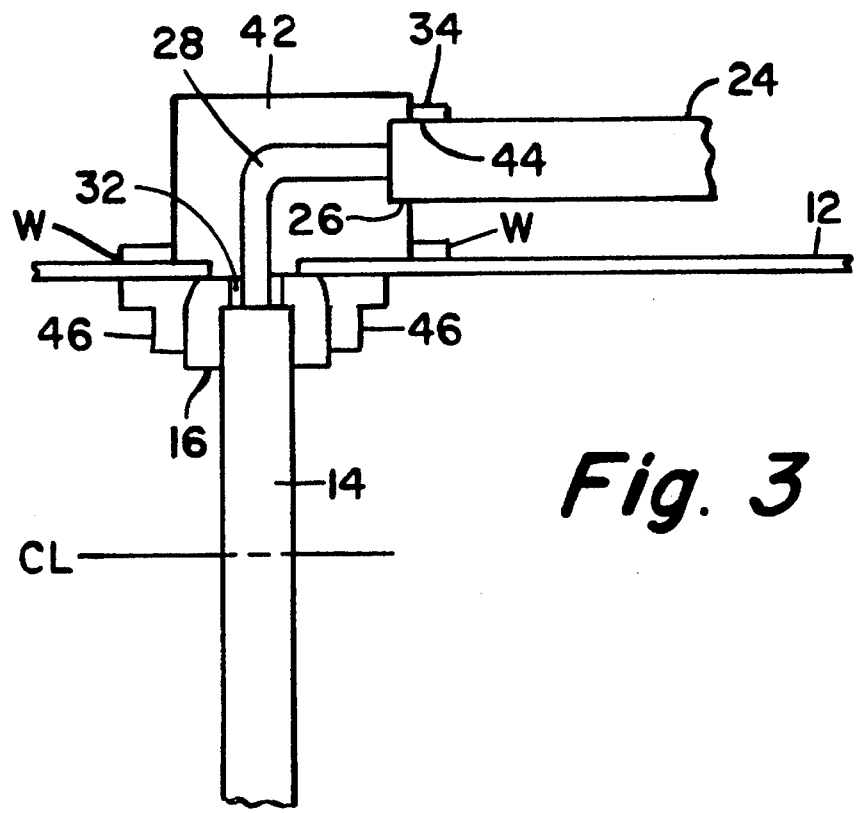
FIG. 3 is a fragmental schematic illustration, partially in section, of a further embodiment for connecting the mineral insulated cable to an electrically heated catalytic converter.

Referring now to FIG. 3, a further embodiment of a possible connection of mineral insulated cable to the heater element of an electrically heated catalytic converter is schematically shown. The inner conductive core 28 of the mineral insulated cable 24 extends well beyond the outer sheath 26 and is bent at a sharp angle before being stud welded at 32 to the heater body element 14. A shaped can 42 is provided which covers the bent portion of the inner conductive core 28 and is welded to the exhaust system enclosure housing 12 as shown by weld W. The shaped can 42 has an opening 44 within which the cable 24 projects, and to which the outer sheath 26 is welded at 34. The assembly of the bent inner core 28 and the shaped can 42 provides a low profile connection which does not require very much space, and may be necessary with some automotive installations. Alternatively, the exhaust system enclosure can be shaped at the connection location to provide for the mineral insulated cable to enter at other than a right angle. As shown in FIG. 3, the heater element 14 may be retained within the exhaust system enclosure 12 by a pair of rings 46 welded to the exhaust system enclosure and having the customary ceramic insulation 16 positioned therebetween. Also, if desired the enclosed space within the shaped can 42 may be filled with mineral fiber insulation.

Figure 4:
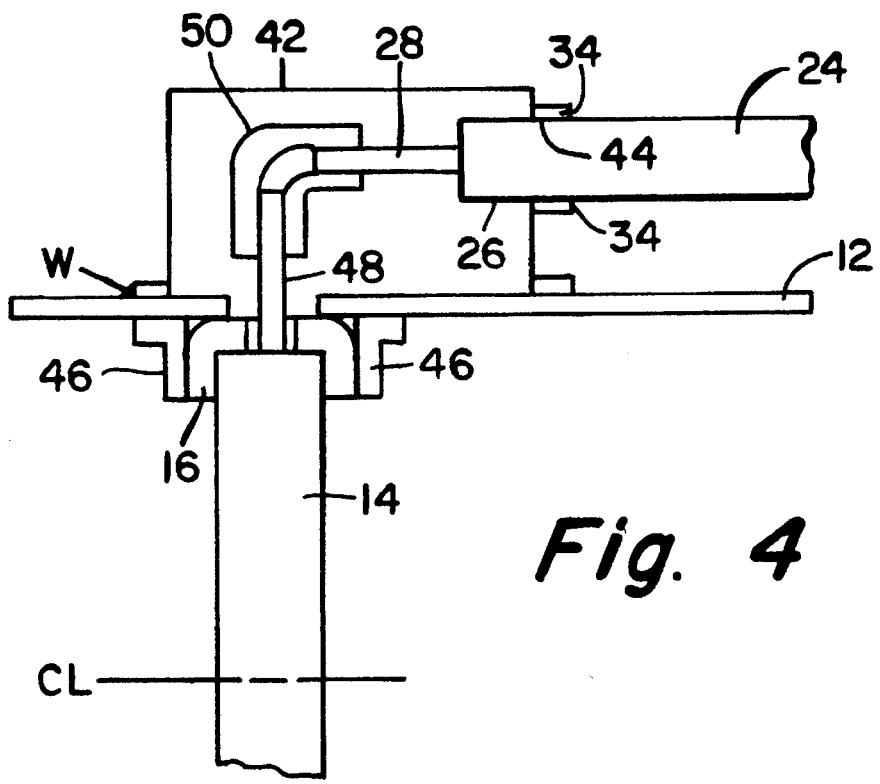
FIG. 4 is a fragmental schematic illustration, partially in section, of a still further embodiment of the invention.

Reference is now made to a further embodiment shown in FIG. 4, which in many respects is similar to that shown in FIG. 3. However, a conventional stud electrode 48 is shown attached directly to the heater body element 14 and extends outside of the exhaust system enclosure 12 where the conventional stud electrode is then connected to the inner conductive core 28 of the mineral insulated cable 24, such as by a right angle crimping connector 50, or by welding the terminal to the inner conductive core 28. As in the embodiment shown in FIG. 3, a shaped can 42 encloses the connection to the exhaust system enclosure 12.

Although the now preferred embodiments of the invention have been disclosed, it will be apparent to those skilled in the art that various changes and modifications may be made thereto without departing from the spirit and scope of the invention as defined in the appended claims.

We claim:

1. A fluid heater with an attached electrical lead connection comprising:

an electrically conductive heater body element insulatively positioned within an enclosing housing;

a mineral insulated cable having a metal outer sheath, a conductive inner core, and insulation material separating said inner core from said outer sheath;

said inner core extending into the enclosing housing, having a bent portion exterior to the housing, and being connected as an electrical lead connection to said heater body element;

a shaped can covering the bent portion of the inner core and being attached to the enclosing housing;

said outer sheath being connected to the shaped can; and, said insulation material electrically insulating said heater body element and inner core from said shaped can, enclosing housing and outer sheath.

2. A fluid heater as defined in claim 1 wherein said enclosing housing is of metal.

3. A fluid heater as defined in claim 1 wherein said inner core is welded to said heater body element.

4. A fluid heater as defined in claim 1 wherein said mineral insulated cable has an end remote from the electrical lead connection to the heater body element and a length sufficient that the end has a temperature below 200° C. when the electrical lead connection is at a temperature in the range of 600°–800° C.

5. In an electrically heated catalytic converter having an electrically-conductive heater body element enclosed within a metal housing with insulating material therebetween for electrical isolation and an electrical lead connected to the heater body element, the improvement which comprises:

said electrical lead comprising a mineral insulated metal-sheathed cable having an end remote from the electrical lead connection to the heater body element;

said mineral insulated cable having a conductive inner core, a metal outer sheath, and an oxide insulation material separating the inner core and the outer sheath for electrical isolation;

said metal outer sheath being welded to said metal housing, and;

said conductive inner core extending within said housing and being welded to said electrically-conductive heater body element;

the mineral insulated cable having a length sufficient that the temperature of the end remote from the electrical lead connection to the heater body element is below 200° C., when the electrical lead connection is at a temperature in the range of 600°–800° C.; and the electrical lead being sealed against corrosion from salt and water.

6. The electrically heated catalytic converter of claim 5 wherein said mineral insulated cable has the outer sheath made of stainless steel, the inner conductive core of nickel, and the insulation material of magnesium oxide therebetween.

7. A fluid heater with attached electrical lead connection comprising:

an electrical Lead comprising a mineral insulated cable having a bent metal outer sheath, a conductive inner core, and insulation material separating said inner core from said outer sheath;

said inner core being connected to an electrically conductive heater body element insulatively positioned within an enclosing housing and said cable having an end remote from the heater body element;

said outer sheath being connected to said enclosing housing; and, said insulation material electrically insulating said heater body element and inner core from said enclosing housing and outer sheath;

the mineral insulated cable having a length sufficient that the temperature of the end remote from the electrical lead connection to the heater body element is below 200° C., when the electrical lead connection is at a temperature in the range of 600°–800° C.; and the electrical lead being sealed against corrosion from salt and water.

8. A fluid heater in accordance with claim 7 wherein said length is between 4 inches and 5 inches.

9. A fluid heater as defined in claim 7 wherein at least two of said mineral insulated cables are connected to said fluid heater, and each said cable extends a length of at least about 5 inches from said connections.

10. A fluid heater as defined in claim 7 wherein said metal outer sheath projects through said enclosing housing and is welded thereto, and said inner core extends beyond said sheath and is welded to said heater body element.

11. A fluid heater as defined in claim 7 wherein a stand off is connected to said enclosing housing to maintain said mineral insulated cable in spaced relation to said fluid heater so as to facilitate the cooling of said cable.

12. A fluid heater as defined in claim 7 wherein said inner core is a solid core formed of nickel, said outer sheath is formed of stainless steel, and said insulation material is formed of magnesium oxide.

* * * * *